Aug. 1, 1933.  C. W. MÜLLER  1,920,761
METHOD OF AND APPARATUS FOR THE PRODUCTION OF COVERED BOXES
Filed Sept. 7, 1929    12 Sheets-Sheet 1
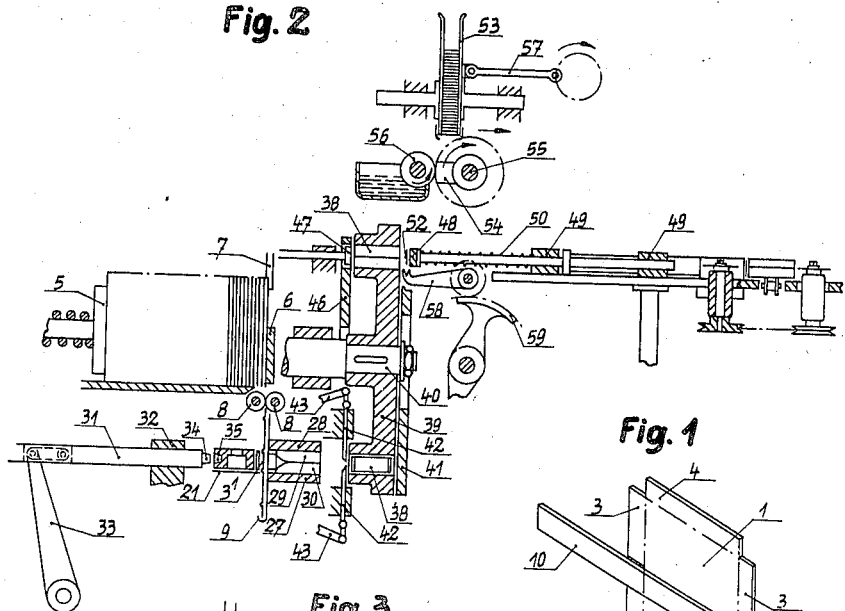
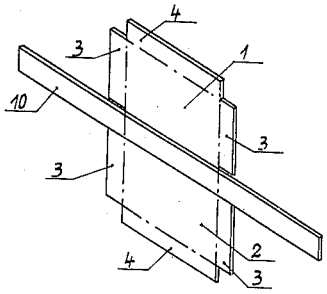
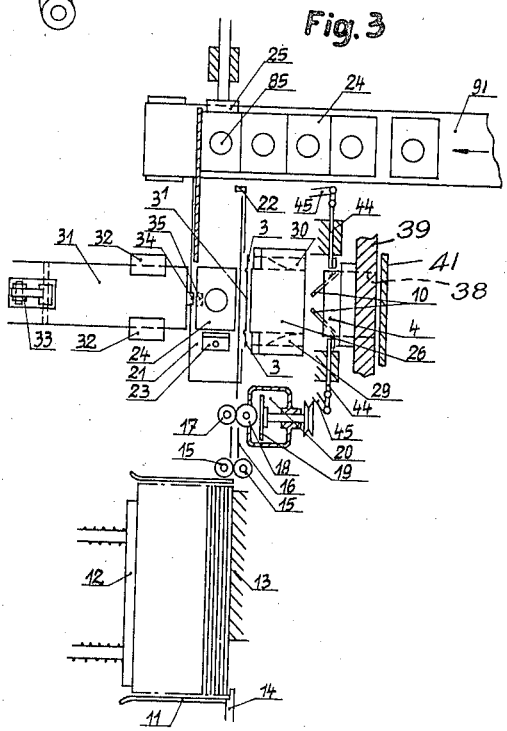
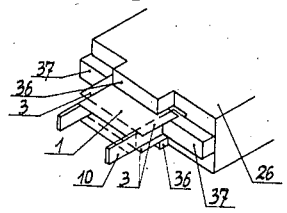
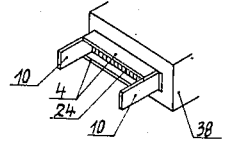
Inventor
Carl Wilhelm Müller
by Max D. Ordmann
Attorney

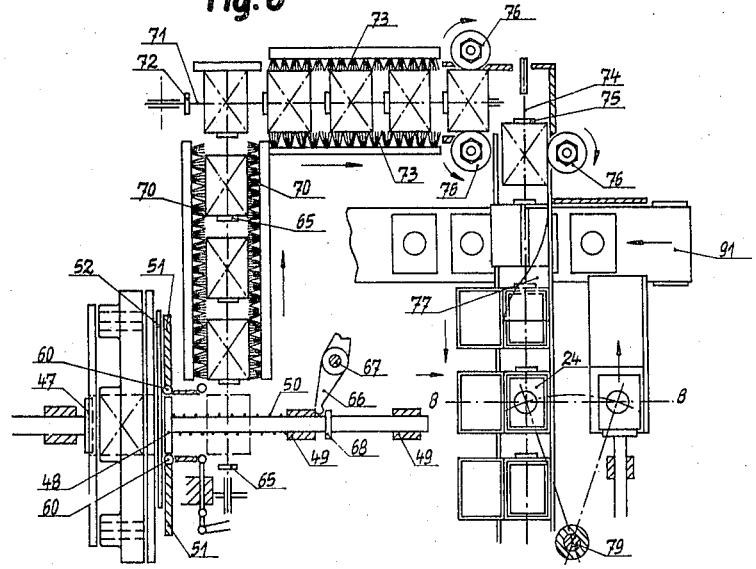

Aug. 1, 1933.  C. W. MÜLLER  1,920,761

METHOD OF AND APPARATUS FOR THE PRODUCTION OF COVERED BOXES

Filed Sept. 7, 1929  12 Sheets-Sheet 3

Inventor
Carl Wilhelm Müller
by Max D. Ordmann
Attorney

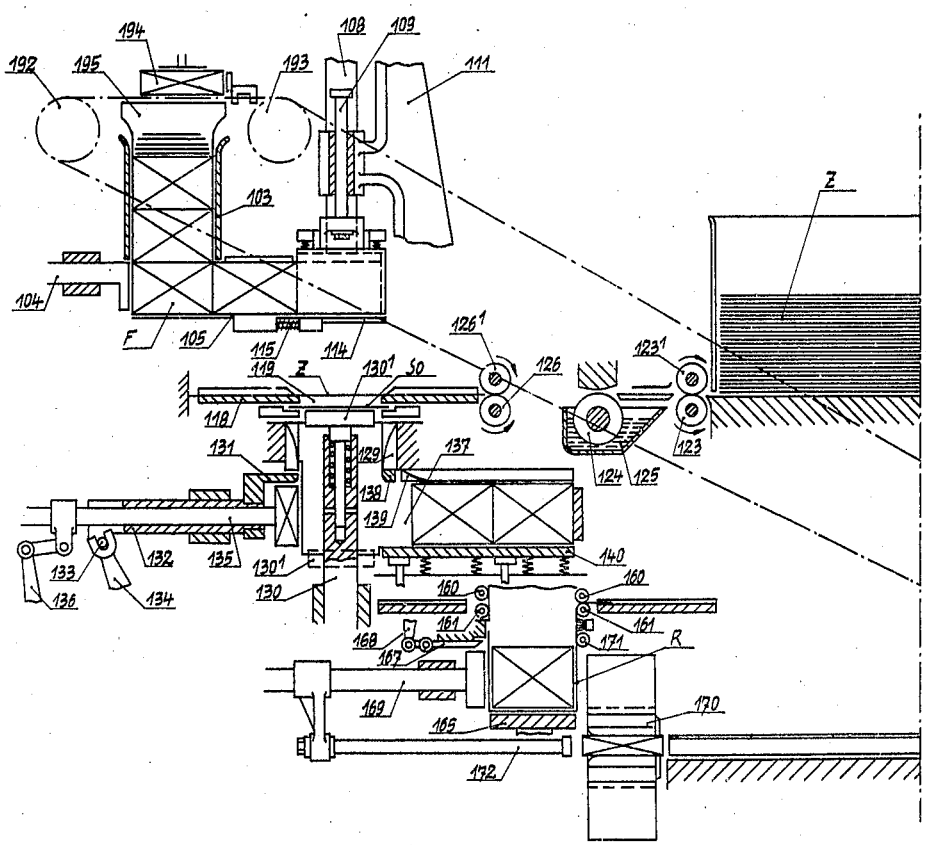
Fig. 13$^a$

Aug. 1, 1933.  C. W. MÜLLER  1,920,761
METHOD OF AND APPARATUS FOR THE PRODUCTION OF COVERED BOXES
Filed Sept. 7, 1929    12 Sheets-Sheet 5
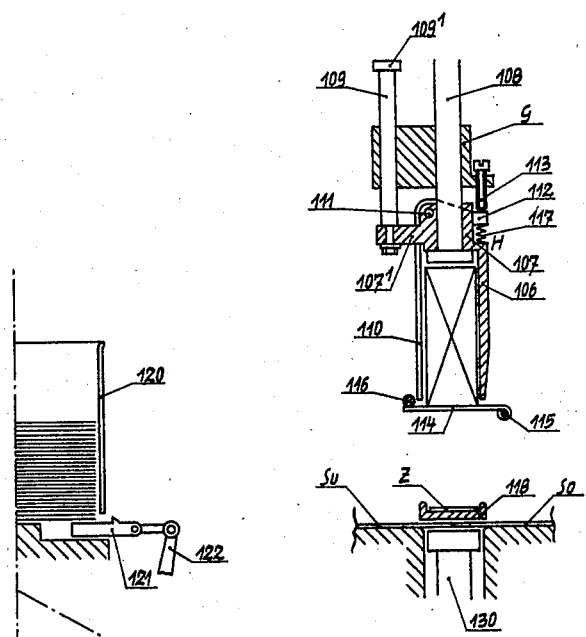
Fig. 15
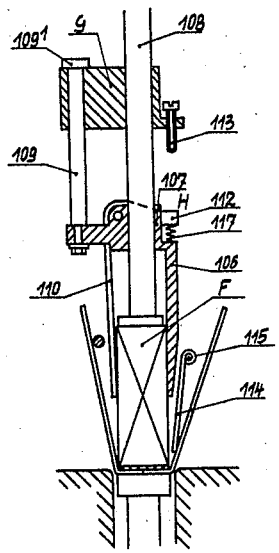
Fig. 16
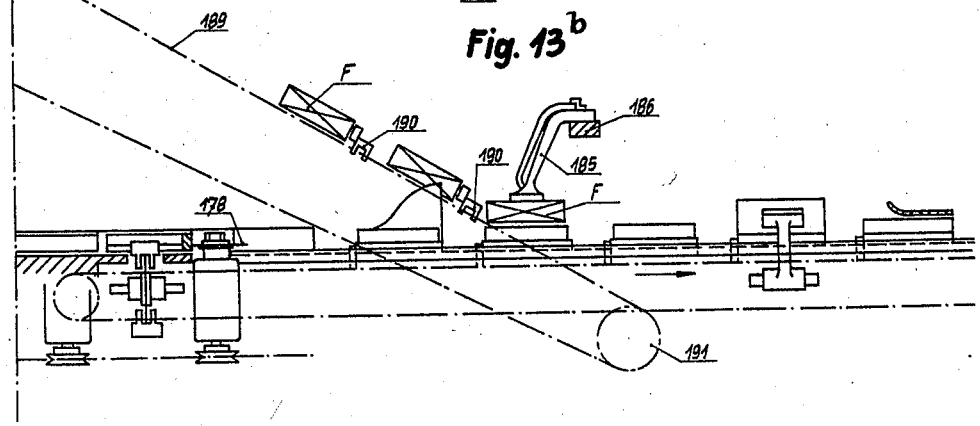
Fig. 13ᵇ
Inventor
Carl Wilhelm Müller
by Max D. Ordmann
Attorney Aug. 1, 1933.  C. W. MÜLLER  1,920,761
METHOD OF AND APPARATUS FOR THE PRODUCTION OF COVERED BOXES
Filed Sept. 7, 1929  12 Sheets-Sheet 6
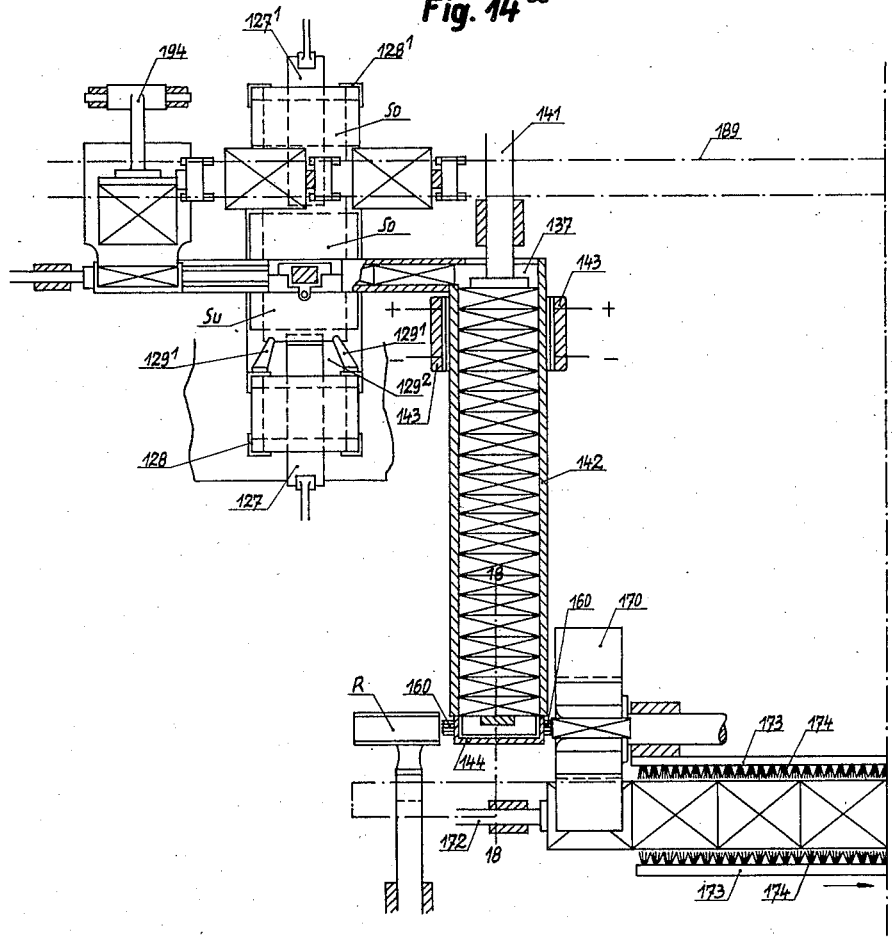
Fig. 14ᵃ
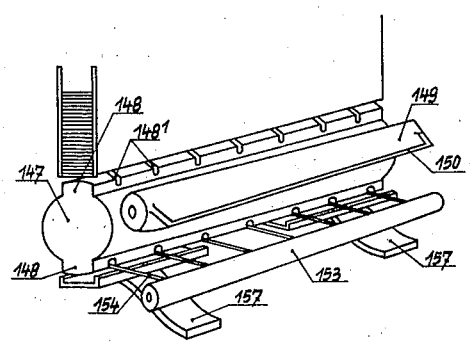
Fig. 17
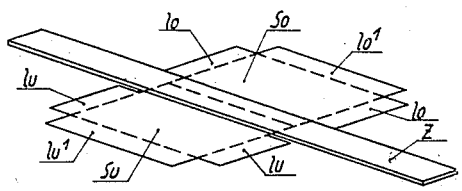
Fig. 19
Inventor
Carl Wilhelm Müller
by Max D. Ordmann
Attorney Aug. 1, 1933.     C. W. MÜLLER     1,920,761
METHOD OF AND APPARATUS FOR THE PRODUCTION OF COVERED BOXES
Filed Sept. 7, 1929     12 Sheets-Sheet 7
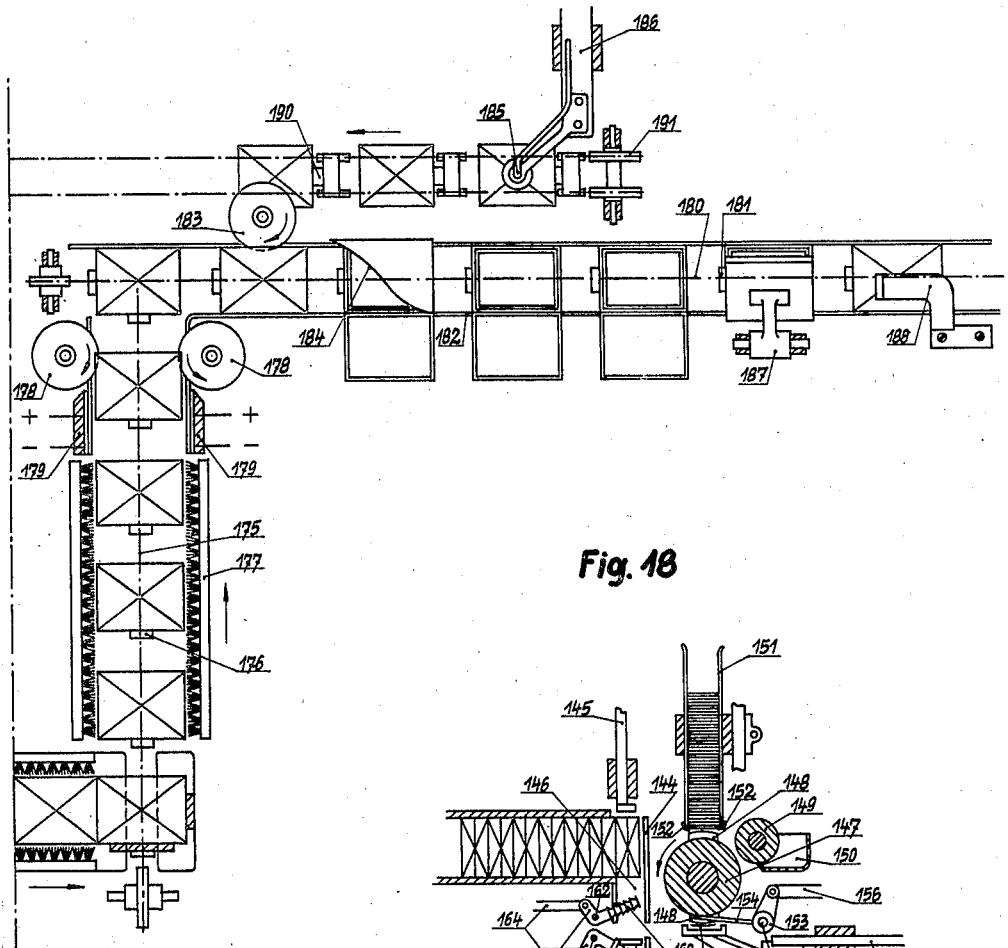
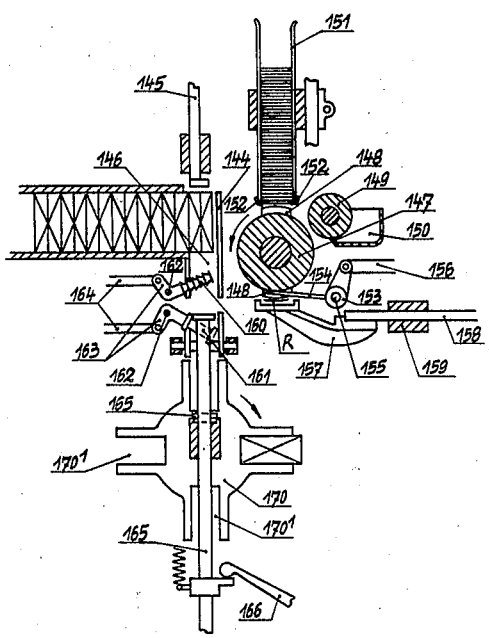
Inventor
Carl Wilhelm Müller
by Max D. Ordmann
Attorney Aug. 1, 1933. C. W. MÜLLER 1,920,761
METHOD OF AND APPARATUS FOR THE PRODUCTION OF COVERED BOXES
Filed Sept. 7, 1929 12 Sheets-Sheet 8

Inventor
Carl Wilhelm Müller
by Max D. Ordmann
Attorney

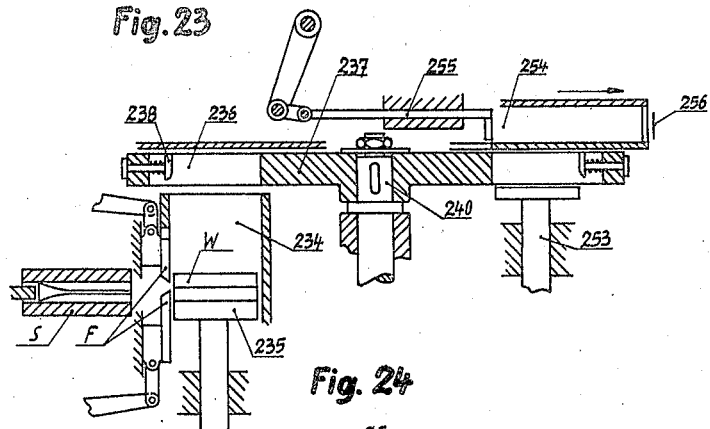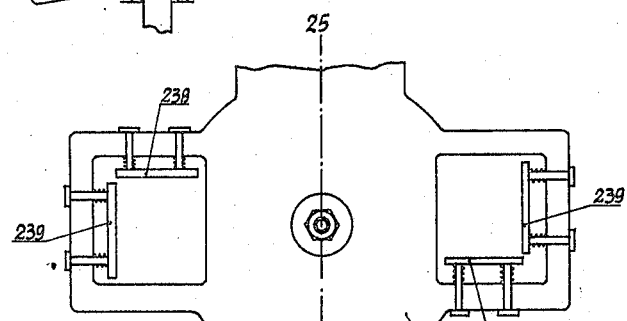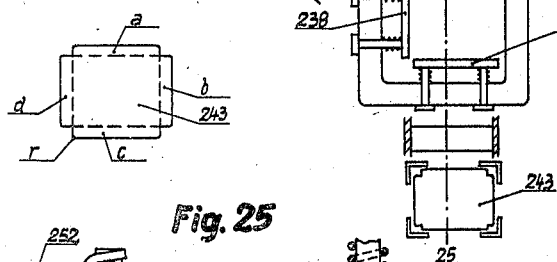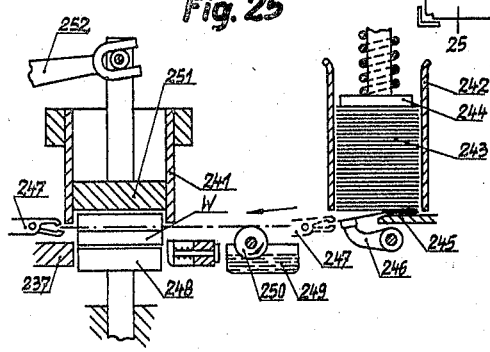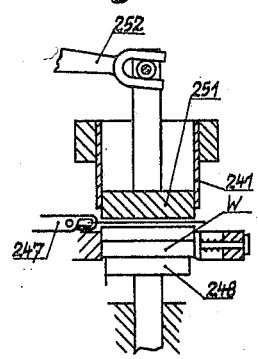

Aug. 1, 1933. C. W. MÜLLER 1,920,761
METHOD OF AND APPARATUS FOR THE PRODUCTION OF COVERED BOXES
Filed Sept. 7, 1929 12 Sheets-Sheet 10
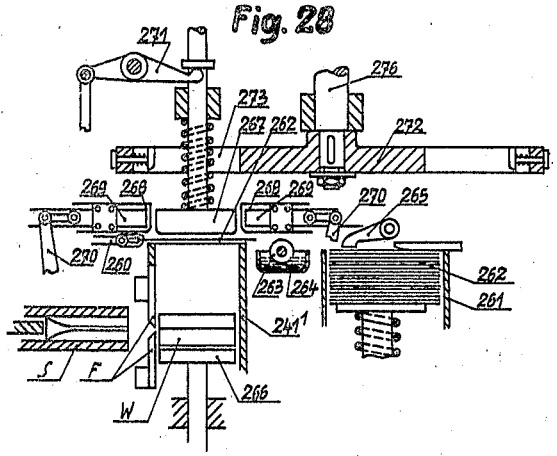
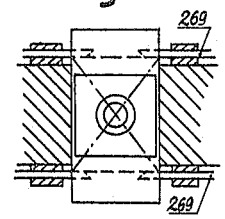
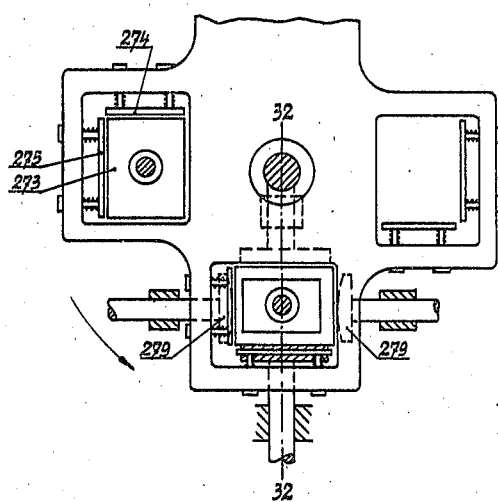
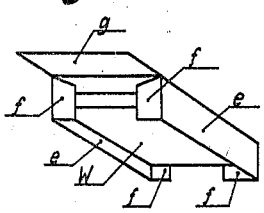
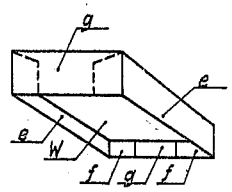
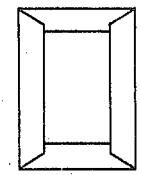
Inventor
Carl Wilhelm Müller
by Max D. Ordmann
Attorney Aug. 1, 1933.  C. W. MÜLLER  1,920,761
METHOD OF AND APPARATUS FOR THE PRODUCTION OF COVERED BOXES
Filed Sept. 7, 1929  12 Sheets-Sheet 11

Aug. 1, 1933.   C. W. MÜLLER   1,920,761
METHOD OF AND APPARATUS FOR THE PRODUCTION OF COVERED BOXES
Filed Sept. 7, 1929   12 Sheets-Sheet 12

Inventor
Carl Wilhelm Müller
By
Max H. Srademann
Atty

Patented Aug. 1, 1933

1,920,761

UNITED STATES PATENT OFFICE 1,920,761

METHOD OF AND APPARATUS FOR THE PRODUCTION OF COVERED BOXES

Carl Wilhelm Müller, Dresden-Weisser Hirsch, Germany, assignor to the firm Universelle Cigarettenmaschinen-Fabrik J. C. Muller & Co., Dresden, Germany Application September 7, 1929, Serial No. 391,063, and in Germany September 20, 1928

19 Claims. (Cl. 93—39)

Boxes or cartons comprising a base portion and a lid applied to the base portion in the manner of a cap are manufactured by aid of one device which produces the base or body portion, a further device which produces the lid, and a third device which produces the closed neck strip. By means of another device the neck strip is opened and inserted in the base portion of the box. It has also been proposed to combine the production of the base portion with the insertion of the neck strip and also to form the closed neck member in the die press. The box member lined with a neck portion must thereafter be connected by aid of a separate device with the base portion, and the edge strip gummed thereto, so that after severance of the box on three sides the article is finished.

Although it has also been proposed to combine all these devices together, i. e., to connect them in series, the mode of operation hitherto adopted always required the arrangement of a plurality of devices for producing the several parts of the box and the neck member as well as for connecting these parts together.

In accordance with the method of the present invention a blank including both the base portion and the lid portion united with an open gummed neck strip is formed in a shaping channel by means of a forming block to constitute a box-like structure. In this manner it is possible to dispense with the numerous separate devices hitherto usual and to simplify, accelerate and cheapen the process of production.

To the blank comprising both the base portion and the lid portion the gummed open neck strip is applied and united adjacent to the portion connecting the two parts of the blank and the united parts are introduced by the aid of a forming block, positioned at the uniting point and profiled in correspondence with the internal dimensions of the box to be formed, into the shaping channel in which, except for the side where the feeding means act on the forming block, the shaping of the box is completed, whereupon the feeding means is retracted and the remaining box part closed by folding fingers or the like, and on the further feeding movement of the box structure it is united with a gummed closing strip in a second channel. The completely formed box entirely surrounds the forming block and said box is now moved over a track on which by known cutting means a continuous slit is cut in three of the side edges of the box so that the top half of the box may be folded over along the uncut side to open said box subsequent to the cutting step to permit removal of said folding block.

As will be evident, in this method the box body produced from a single blank is shaped continuously until completion in one operation and is not necessarily transferred to a plurality of devices.

The blank used may be in one piece, but it may consist of two structurally separate parts, namely, a part corresponding to the base portion and a part corresponding to the lid of the box to be formed, so that for the one part (the lid) a better material may be used than for the base portion, as is at present usual. If the blank is in two parts, these two parts are brought with their relative side flaps into abutting relation in front of the shaping channel and the gummed neck strip placed on the abutting parts.

The device for performing the method of the present invention is characterized further by a suitably operated gripper formed as a suction-head or the like, which removes the forming blocks from the opened boxes and deposits them on a conveyor track which delivers the forming blocks over a chute to a vertical pile. From this pile the forming blocks are removed by a plunger or the like and fed to a point where they meet the blanks, the article being formed in a continuous operation, provided with an edge strip cut and passing to the point where after opening the lid of the box the forming block is removed. In this manner it is possible in a single machine in which the feed of the work to the several working stations is intermittent to provide a completely closed cycle for the forming blocks employed for the formation of the articles. Provision is made to time the several parts of the machine in relation to one another so that the articles are always transferred at the right time and in the right condition and thus to ensure the travel of the forming blocks as hereinafter described with reference to the accompanying drawings.

If the blanks and neck strips are previously prepared and piled, structurally complicated devices and complicated methods of working to unite these parts are necessary. Apart from this, the preparation of these parts requires separate machines.

In accordance with a further feature of the invention both the box blank and also the neck strip are prepared from continuous strips fed at right angles to one another and in their travel subjected to stamping, gumming, printing, operations etc.

In this manner it is possible to work in a single machine in a continuous working cycle on strips coming from two spools and at suitable points, to finish off the blanks as regards their imprints, or application of gummed labels, the cutting out of recesses, formation of slits or grooves, etc., and also the neck strip can be treated by gumming devices, cutters etc., so that at the junction point where the strips meet only the forming block requires to be located in position and the box parts separated from their strips to be pressed into the shaping channel.

Often it is sufficient to make the base portion of the box of flimsier material than the lid. In this case in operating in accordance with the invention two continuous strips of different quality are used and two blank portions (a lid and a base member) are produced. In accordance with a further feature of the invention the two strips are fed in directions towards one another and meet at the point where the neck strip is applied and the forming block positioned.

In order now to apply the label in the course of production of the box, in accordance with a further feature of the invention, after the closing of the box, but before applying the gummed closing strip, the closed box passes opposite a shaping channel in which operates a suitably controlled die which applies a label placed on the box body on the entrance of the box body carried by a plunger into the shaping channel, whereupon the article provided with the label is transferred to a conveyor and thence conveyed to the shaping channel where its junction with the gummed closing strip takes place.

In the case where the boxes are not provided with a gummed closing strip but there is employed a label covering, the marginal wings of which cover the sides of the box and also extend beyond the same to the under side, the method is so practised that two opposite side wings of the label which are intended to cover two sides of the box and also project beyond the bottom edges of said sides are folded over said two sides on passage of the article through a shaping channel open on the other two sides. Thereafter the projecting tabs of these folded side wings are folded over by plungers guided on side walls of the shaping channel respectively onto said two other sides of the box. On entrance of the box body into a recess in the means for effecting further feeding movement the two remaining opposed side wings of the label are folded onto said other two sides of said box. After travel of the feeding means to another point, the article is brought by means of two vertical plungers into the path of two pairs of folding fingers working at right angles to one another which position the overlapping portions of the side wings, extending beyond the side walls of said box, under the bottom thereof. Finally the article transferred to the feeding means by the retreating dies is transferred to means which cut the box, unfold the lid and remove the forming block.

The invention is illustrated by way of example in the accompanying drawings.

Fig. 1 shows the blank and open neck strip laid thereon. Fig. 2 is a vertical longitudinal section through the device. Fig. 3 is a plan view. Figs. 4 and 5 are detail views showing in perspective the article partly entered into the different channels. Fig. 6 is a plan view of a part of the mechanism associated with the application of the closing strip, the cutting of this closing strip, the opening of the box and removal of the forming block. Fig. 7 is a like view of part of the mechanism in a different position. Fig. 8 is a vertical cross section on the line 8—8 of Fig. 6. Fig. 9 is a side elevation viewed in the direction of the arrow in Fig. 8. Figs. 10 to 12 show a modified arrangement adapted for handling blanks each consisting of two parts. Fig. 10 is a vertical longitudinal section. Fig. 11 shows in perspective the blank with the neck strip laid thereon viewed in the direction of the arrow in Fig. 10. Fig. 12 is a horizontal cross section on the line 12—12 of Fig. 10. A further embodiment is illustrated in Figs. 13 to 19, Fig. 13 being an elevation, the said Fig. 13 for convenience of showing, is in two parts represented by Fig. 13a and 13b, the latter being a continuation of the former along the broken line; Fig. 14 a plan, the said Fig. 14 for convenience of showing, is in two parts represented by Figs. 14a and 14b, the latter being a continuation of the former along the broken line and Figs. 15 to 19 detail views. An embodiment of the invention in which the box blanks and also the neck strips are prepared from continuous strips fed at right angles to one another and subjected in their travel to stamping, gumming, printing, operations etc., is illustrated in Figs. 20 to 22, Fig. 20 being a vertical longitudinal section on the line 20—20 of Fig. 21, Fig. 21 a plan view, and Fig. 22 a vertical cross section on the line 22—22 of Fig. 21. Two embodiments in whch the boxes are provided in the course of their production with labels are shown in Figs. 23 to 27 and Figs. 28 to 36. Fig. 23 is a vertical cross section through the parts under consideration of the new device. Fig. 24 is a plan view. Fig. 25 is a vertical cross section on the line 25—25 of Fig. 24. Fig. 26 is a detail view. Fig. 27 is a view of the label employed. Fig. 28 is a vertical cross section showing the construction of the second of these embodiments. Figs. 29 to 36 are details relating to the last embodiment.

Figure 10:
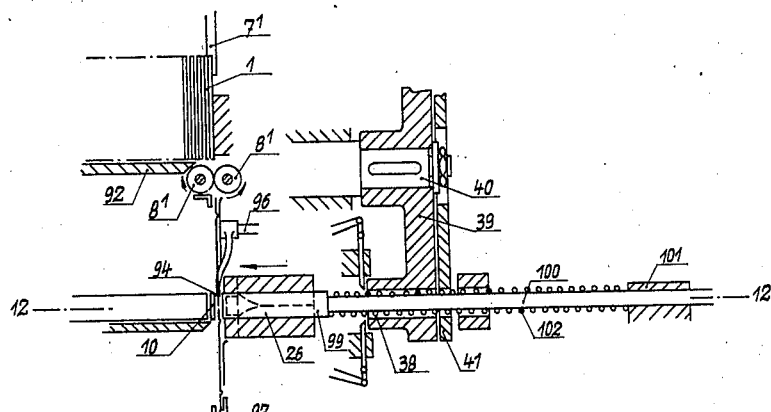

Referring to Figs. 1 to 9, the blanks have the form shown in Fig. 1. They are in one piece, but consist of two parts, namely the lid part 1 and the base portion 2 with their associated side flaps 3 and 4. These blanks are stacked and pressed by means of a spring-pressed plunger 5 against a front abutment face 6. From the stack the foremost blank for the time being is pushed downwards by a controlled plunger 7 at the correct moment between the guide and feed rollers 8 which bring the blank abutting on the stop 9 in front of the shaping channel in such manner that the intermediate portion 3' connecting the two parts 1 and 2 comes to be in front of the opening of the shaping channel.

The open neck strips 10 are arranged edgewise in a stack 11 and are pressed by a spring-pressed plunger 12 against a fixed abutment 13. The foremost strip for the time being is pushed laterally by a controlled plunger 14 at the correct moment, so that it passes between the feed rollers 15 into a channel 16 and then between the gumming rollers 17, 18. The roller 17 acts as a pressure roller while the roller 18 engages a gumming roller 19 which extends into a gum bath 20. The gumming roller 18 thus transfers adhesive to one side of the neck strip 10. The pair of rollers 17, 18 feeds the gummed neck strip further and in upright position to the table surface 21 in front of the blank disposed adjacent to the shaping channel in such manner that the neck strip comes in front of the portion 3' of the blank as will be seen in particular from Fig. 1. The neck strip is now presenting its gummed face to the blank. The feeding movement of the neck strip is limited by a stop 22 so that the neck strip must move always into the correct position.

On the table 21 is located a stop 23 for a forming block 24. This forming block is withdrawn from a magazine by means of a plunger 25 and advanced to the stop 23. In its advanced position the plunger is located directly in front of the shaping channel 26. This shaping channel is open at both ends and has a fixed bottom 27 and a fixed roof 28. It is, moreover, made in two parts in such manner that the side walls consist each of two guide bars 29, 30 formed as curves.

Opposite the forming block 24 which has arrived in front of the shaping channel 26 is located a controlled plunger 31 which slides horizontally in guides 32, and is reciprocated by an actuating lever 33. This plunger engages with a pin 34 in a corresponding recess 35 on one end face of the block 24, and in its forward movement pushes the forming block into the shaping channel 26. The neck strip is pressed firmly on the portion 3¹ of the blank and both parts are drawn into the shaping channel. The upper end of the shaping channel 26 is formed in the manner shown in Fig. 4. It is provided with projections 36, 37 which ensure that on entrance into the shaping channel first the blank is folded to U-form, i. e., the two parts 1, 2 are turned over, and also the neck strip is shaped to U-form. Care is taken that the projections 37 coming into contact with the neck strip are provided with recesses adjacent which are moved the gummed parts of the neck strip.

On the further advance of the plunger 31 the forming block 24 with the blank and neck strip is introduced to the full extent into the shaping channel 26, the side flaps 3 of the blank 1, 2 being folded inwards by the lateral guide bars, 29, 30 and thus laid on the neck strip.

The plunger 31 advances further and pushes the article so far completed into a second shaping channel 38 which in the embodiment shown is arranged in a rotary turntable 39 which is intermittently rotated about the axis 40. The shaping channel 38 is open at both ends and profiled to correspond to the size of the article. The rear end of the shaping channel 38 is covered by a fixed wall 41 up to which the plunger 31 moves the forming block with the article thereon, whereupon the plunger returns to its initial position, leaving the forming block in the channel 38. At the mouth of the channel 38 operate vertically movable folding fingers 42 which are influenced by levers 43 and horizontally movable folding fingers 44 which are operated by lever 45. The folding fingers 42, 44 operate in succession. The length of the channel 38 is suited to correspond to the dimensions of the work so that only the side flaps 4 not yet pressed in and the ends of the neck strip not yet pressed in project from the channel. The folding fingers 42, 44 operate in succession so that first the horizontally movable folding fingers 44 press inwards the still stationary ends of the neck strip, whereupon the vertically operating folding fingers 42 press in the side flaps 4 so as to complete the formation of the article.

When this is done, the intermittent rotation of the revolver disc or turntable 39 is effected, a closing plate provided at the extreme side of the channel 38 disposed in front of the opening of the channel preventing the side flaps 4 from springing open again. From Fig. 5 it will be observed how the ends of the neck strip 10 and the side flaps 4 which are to be pressed against the forming core 24 by the operating fingers 42, 44 project from the channel 38.

The further movement of the revolving disc 39 is so effected that the channel 38 moves into the path of two plungers 47, 48 which are located opposite one another. The plunger 47 penetrates an opening in the cover plate 46 from one end of the channel and presses the article in the channel against the plunger 48 which is arranged to be movable longitudinally in the horizontal guides 49, a spring 50 coiled around the plunger rod being compressed in such longitudinal movement (see Figs. 2 and 6).

The plunger 48 is pressed forwards by the spring 50 until its front face comes flush with the vertical guide surfaces 51. Along these guide surfaces are guided the closing strips 52. The closing strips are arranged in a vertical pile 53. The lowermost strip of this pile is removed by means of a segment 54 mounted on the shaft 55 and coming on each rotation of the shaft once in contact with the gummed roller and then with the lowermost strip of the pile 53. When such contact takes place, the horizontally movable pile operated by a connecting rod 57 moves therewith so as to ensure complete contact of the gumming segment 54 with the lower side of the closing strip. This closing strip is removed by the segment 54 and on the further rotation fed to a gripper 58 which removes the strip 52 from the segment 54 and on its rotary movement effected by a toothed sector brings the strip 52 into the region of the guide surface 51 in front of the plate 48.

When now the plunger 47 advances, it presses the article containing the forming block and in other respects finished against the plunger 48, so that the article is held between two plungers 47, 48. The closing strip 52, the gummed side of which faces the box, presses on the one front face of the article. On the further advance of the plunger 47, the plunger 48 retreats, the rollers 60 provided on the walls 51 bending the closing strip 52 to U-shape and pressing on the two adjacent end faces of the article.

Finally the article passes into the position shown in Fig. 7. In this position a horizontally movable plunger 62 fitted with a roller 61 is caused to act from the side, being operated by the lever 63. This plunger 62 presses one end of the closing strip 52 around the corner of the remaining end wall of the box and presses it against the same.

In the position of the article shown in Fig. 7 it has arrived in the path of a feeding device which consists of a chain 64 or the like provided with entraining members 65 which move the work transversely of its previous direction of feed as soon as the dies 47, 48 have released the work, which is effected by the die 47 returning and the die 48 being pressed forwards by lever 66 which swings about a pivot 67 and engages a collar 68 on the plunger rod.

The article now released is entrained by the pusher 65, a further roller 69 disposed in the path of the feed of the work pressing inwards the remaining end of the closing strip 52. The article is fed into a brushing channel whose brushes 70 facing one another press the closing strip against the article. At the end of this channel the article passes into the path of a feeding device crossing the former at right angles, and consisting of a chain 71 and entraining members 72. The articles are fed by the entraining members 72 into a second brushing channel, whose oppositely disposed brushes 73 effect the close union of the closing strip with the other sides of the box. Then the article is transferred to a third feeding device, namely a chain 74 which again crosses the path of the other feeding device at right angles and is provided with entraining members 75. Cutters 76 which rotate in the direction of the arrow now act from the side on the article and cut it on three sides.

The chain 74 feeds the work after it has been cut on three sides into the path of the cam 77 which engages the gap between the lid and the base portion of the article and opens the lid and finally turns it completely over, so that the forming block 24 resting in the box is exposed and can be removed.

The forming block is removed from the article (Figs. 8 and 9) by means of a gripper which is carried by a rocking arm 78 pivotally mounted on the vertical pivot 79. On this rocking arm is provided a downwardly extending support 80 from which the gripper jaws 81 project downwards. These jaws are operated by a double-armed lever 82 which is pivotally mounted on the rocking arm 78 and carries a controlling rod 83 extending into the support 80 and operating the means for spreading or expanding the jaws of the gripper. To the other end of the lever 82 is pivoted a connecting rod 84 which is moved in suitable manner.

The open box resting on the feeding device 74 contains the forming block or core 24. This forming core is provided with a central recess 85, presenting a stepped portion 86. The gripper support 80 is rocked so that it extends over the recess 85. The gripper is then lowered so that its lower end enters the recess 85. The gripper jaws 81 are then spread apart so that they lie beneath the undercut formed by the step 86. Then the gripper support 80 is raised, the forming core being entrained therewith. On this raising movement fingers 87 press against the edge of the core so that the box is stripped from the ascending forming core. The gripper support is then rocked until the forming core comes above a surface 88. Then the jaws 81 are retracted and the gripper support 80 moves upwards so that the forming core 24 is deposited on the surface 88. This surface is adjoined to a chute. The forming core is pushed on to the chute by means of a plunger 90 and from the chute the forming core passes to an endless conveyor band 91 which returns the forming core to the point where the plunger 25 brings the core in front of the first shaping channel 26.

As is clear, the article with the base portion, lid and inserted neck is produced from a single blank in a single shaping operation.

Figure 11:
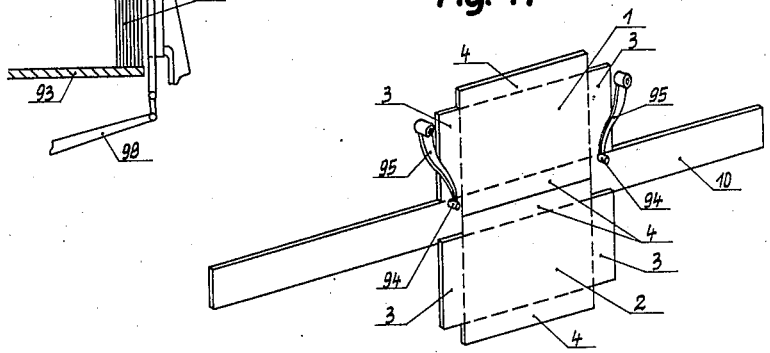
Figure 12:
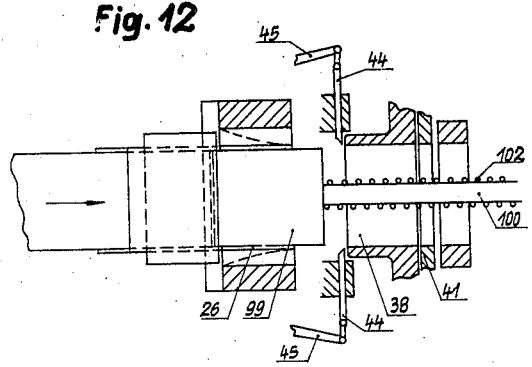

In the embodiment shown in Figs. 10 to 12 the two parts of the blank (as shown in Fig. 11) are structurally separate, but their side flaps 4 abut and the open neck strip 10 is applied at the point of abuttal. The blank portions 1 are located in an upper pile 92 while the other blank portions 2 are located in a lower pile 93.

The upper blank portions are fed by the plunger $7^1$ between the feeding rollers $8^1$ downwards until the lower edges of the side flaps 3 abut on stops 94 which are arranged at the end of rocking arms 95. These rocking arms are mounted on the correspondingly oscillating horizontal axes 96.

The lower blank portions 2 are fed upwards by a plunger 97 with the aid of the lever 98 engaged therewith, until the upper side flaps 4 thereof abut against the side flaps 4 of the blank 1. The gap or line of separation is located exactly midway of the height of the shaping channel 26. Now a die 99 filling this shaping channel is located in the channel, the horizontal rod 100 of which die is guided in a bearing 101, a spring 102 being coiled around this rod and compressed on the movement of the die towards the right as shown in Figs. 10 and 12.

The neck strip 10 is fed in the manner already described and placed in front of the line where the two blanks abut in the manner shown in Fig. 10. The forming block 24 is pressed by the plunger 31 into the channel 26, taking with it the parts 1, 2, 10, the plunger, however, forming a stop so that the three parts united at the point of abuttal are pressed between the forming block and a matrix 99. The further operation proceeds in the manner described in connection with the first embodiment except that the matrix 99 returns into the second channel of the revolver disc or turntable 39 and forms instead of the rear wall 41 an abutment for the article extending into the channel 38. In this position the matrix 99 is arrested when the folding of the article is completed and the revolver disc 39 rotates until a new channel 38 comes opposite the matrix 99, when the spring 102 returns this matrix through the channel 38 into the channel 26.

Before the forming block enters the channel 26 the arms 95 have naturally been swung laterally, in order to return later into their initial position.

In the embodiment shown in Figs. 13–19 the forming block F which is lowermost at the moment is fed from the vertical pile by means of a plunger 104 on the guide 105 to the right in a holder H (106, 108) which is shown in Figs. 15–16 in side elevation to a somewhat larger scale. One side wall 106 of this holder engages by means of the lug 107 the die 108 mounted in the machine frame G. On the lateral projection 107′ of the guide lug 107 is secured the bolt 109 serving as a guide. The side wall 110 of this holder is pivotally mounted at 111 on the projection 107 and with its brackets 112 moves into the uppermost position of the holder against an adjustable stop 113 so that the holder in this position opens somewhat and the forming block can pass comfortably between the two side walls. The flap 114 pivoted at 115 on the frame is urged by a spring against the stop 116 and serves as an extension of the guide 105 and as a support for the forming block. If now the die 108 is moved downwards, the holder moves with it till it reaches the position shown in Fig. 16 where the stop $109^a$ on the bolt 109 strikes against the frame. At the same time, however, the bracket 112 removed from the stop 113 is subjected to the pressure of the spring 117, so that the pivotally arranged side wall 110 presses resiliently against the forming block F, and retains it when, on being struck by the side wall 106, flap 114 is rocked and the forming block F loses its support.

First the forming block comes in contact with the neck strip Z provided on its under-side with adhesive, and resting on the guide plate 118 provided with the recess 119. The neck strips come from a pile 120 from which the lowermost article is guided by means of a plunger 121 operated by a lever 122 between a continuously rotated pair of feed rollers 123, 123', which remove the neck strip from the pile, lead it over a gumming roller 124 arranged in the adhesive container 125 and transfer it to a pair of feed rollers 126, 126' adjustable in the direction of feed, which lay the neck strip on the guide plate 118. It should be mentioned here that the narrow thin neck strips have grooves in them to facilitate bending them about the forming block. If they should be only pushed from the pile 120, they would bend before reaching the proper position. To avoid this, the rollers 123 and 123' are provided directly adjacent the pile so that as soon as the pusher 121 pushes the lowermost neck strip slightly out from under said pile, the said rollers 123 and 123' grip it and draw it out the rest of the way and feed it to the rollers 126, 126'. An adjustable arrangement of the pair of feed rollers 126, 126' has the advantage that different lengths of neck strips can be handled on one and the same machine.

On passage through the recess 119 the forming block up-turns the projecting ends of the neck strip to U-shape and while depositing the neck strip bears on the blanks Su and So whose side flaps abut and which have been pushed by plungers 127, 127' from the pile holders 128, 128' into the position shown in Fig. 14, being pressed by the springs 129' against the support 129. The two blanks Su, So shown in perspective in Fig. 19 might be made in one piece. For economical reasons, however, they are made in two parts, as a better material is usually employed for the lid than for the base portion of the carton.

After the flap of the blank Su has been brought in contact with the gummed portion of the neck strip the forming block moved by the die 108 moves downwards and passes through the shaping channel 129 provided with folding means, the die plate 130' mounted on the die 130 acting as a matrix. The die 130 is thus moved downwards corresponding to the movement of the die 108, the die plate 130' being resiliently mounted on the die 130, so as to ensure uniform pressure. During the passage through the shaping channel 129 the two blank portions Su, So are first bent at right angles, whereupon the side flaps lu, lo, are bent at right angles to the neck strip and pressed, the side flaps lu coming in contact with the gummed part of the neck strip. After the die 130 with the plate 130' has moved back into the position shown in dotted lines in Fig. 13, the forming block with the article moves into the path of a folding finger 131 mounted on the sliding brush 132. This folding finger is moved by a device 134 engaging it at 133 to the right in the direction shown in Fig. 13, so that the projecting end of the neck strip is turned over and pressed against the forming block. Now the die 135 operated by the lever 136 moves forwards and pushes the forming block with the article into the channel 137. The still projecting end of the neck strip comes in contact with a bending finger 138 projecting from above into the channel, which bends it at right angles and presses it on the forming block. The still projecting side flaps of the article lu, lo are now also folded over by the bending bars 139. In order to ensure firm pressure of the overturned and gummed parts of all sides, the lower wall of the channel is formed of resilient plates 140.

From the channel 137 the articles are fed intermittently by means of the plunger into a channel 140 at right angles to the first. This second channel, which is of such length that it can receive a large number of articles, is heated by means of electric resistances 143, whereby to dry the still moist gummed portions. When the article strikes the stop 144 located at the end of the channel 142, it is pushed by means of a plunger 145 into a channel 146 (see Fig. 18, which is a vertical section on the lines 18—18 of Fig. 14) before the discharge opening of which the edge strip R coated with adhesive is located.

The roller 147 provided with two gummed segments 148 is intermittently rotated through 180° in the direction of the arrow indicated in Fig. 18. Either segment contacts with the roller 149 located in the gum-bath 150. The edge strip pile holder 151 mounted for vertical movement delivers the lowermost edge strip to the uppermost segment, the resilient fingers 152 arranged at the lower end of the edge strip pile holder serving to ensure that only one article is delivered at a time. The segment 148 carrying the edge strip R is now turned downwards and the fingers 154 on the rod 153 engage notches 148' in the segment, the rod being rotatable about the axis 155, and operated by the link 156 is such manner that it withdraws the edge strip from the segment, and transfers it to a pair of supports 157 (see Fig. 17). This pair of supports 157 is secured to a carriage 158, which transfers the strip R to two pairs of rollers 160, 161 arranged at both sides of the channel 146.

These rollers are mounted on bell crank levers 163 pivoted at 162. These bell crank levers are operated by links 164 in such manner that they receive the edge strip R presented by the supports 157 and move together after the manner of shears, exerting a braking action on the edge strip and placing it against the sides of the article, while the article is moved by the plunger 145 from the channel 146. The die 165 retracted by the lever 166 on the advance of the plunger 145 acts thus as a matrix. When the work has moved so far downwards so that the die 165 reaches the position shown in dotted lines in Fig. 18, which corresponds to the position shown in Fig. 13, the finger 167, operated by the lever 168, first advances, turns over the projecting end of the edge strip and presses it against the box. Now the die 169 advances and pushes the article into the recess 170' in the four-compartment drum 170, the end of the edge strip being held by the roller 171 against the article. On rotation of the drum 170 through 90° the article passes into the path of a plunger 172 connected with the die 169 which pushes the article from the recess into a channel 173, the side walls of which are provided with brushes 174, which press the edge strip against the edges of the article.

The articles are fed from the channel 173 by a conveyor chain 175 provided with pushers 176 which feeds the work step by step through a channel 177 also provided with brushes, at the end of which channel are arranged rotary cutters 178 which cut the box at both sides. Before the articles pass the cutters they are led past a heating pad 179 heated by means of electrical resistances. From the conveyor chain 175 the articles are fed to a conveyor chain 180 also intermittently advanced and having pushers 181 whereby the articles are fed into a channel 182, at the inlet of which is arranged a rotary cutter 183 which cuts one longitudinal side of the box. The object of feeding the intermittently moving boxes at intervals apart to the rotary cutters is to ensure that while the conveying means is stationary no part of the box will be subject to the cutters longer than is necessary, as otherwise the rotary cutters would not produce a clean cut.

After the article has passed a cam 184 located on the channel and serving to open the box, it moves into the path of a suction head 185 which serves to remove the forming block from the box, and which is mounted on a slide 186.

In order to be able to determine whether the box interior is in order, it is moved back a certain distance before it moves into the path of the means 187, 188 which serve to close the box. The suction head 185 places the forming block F removed from the article on an inclined conveyor band 189 provided with pushers 190 and led over rollers 191, 192, 193. The forming blocks are pushed from the band 189 by means of a plunger 194 on to an inclined plane 195 which leads them to the pile holder 103.

Figure 20:
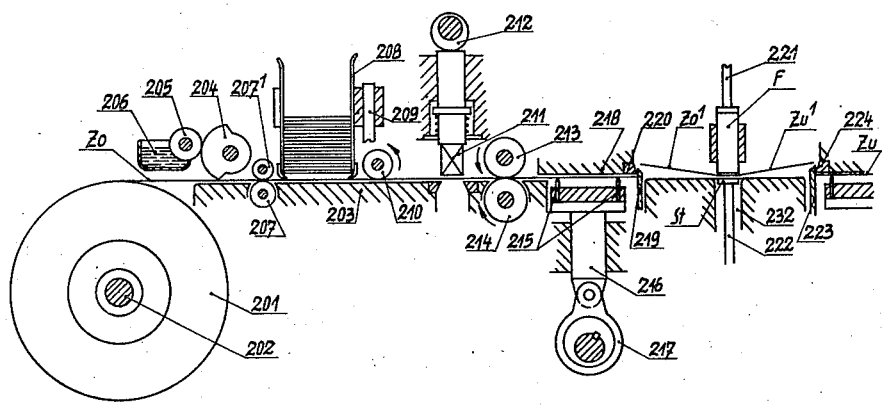
Figure 21:
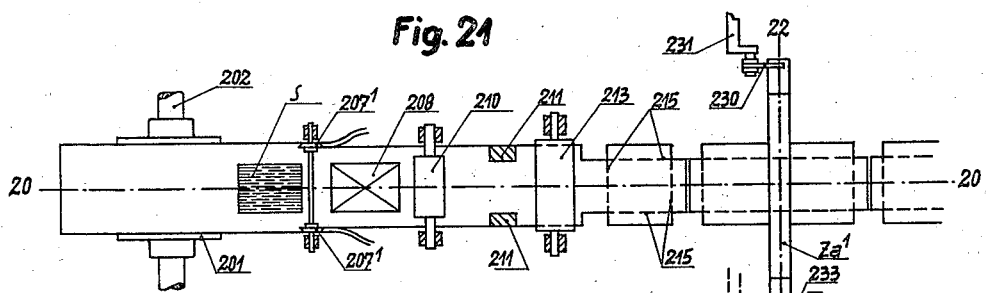
Figure 22:
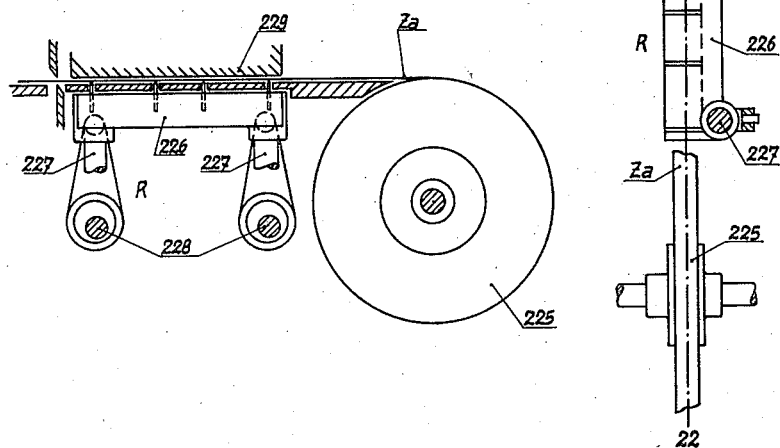
Figure 37:
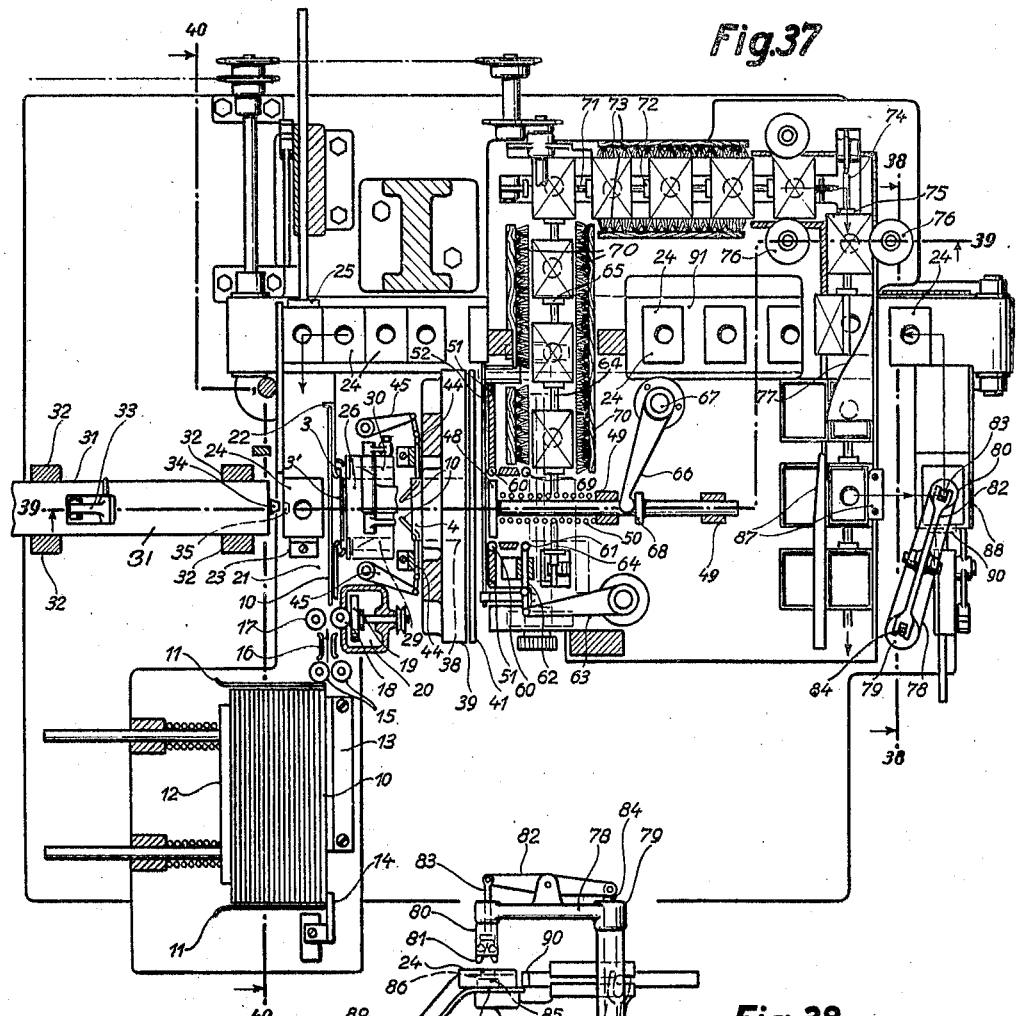
Fig. 37 is a top plan view of the machine and is a combination of the showings of Figs. 3 and 6 of the drawings.
Figure 38:
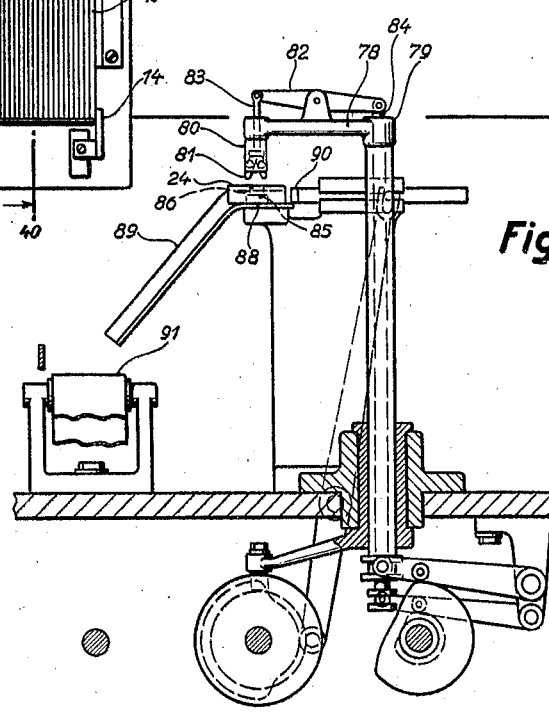
Fig. 38 is a section along line 38—38 of Fig. 37.
Figure 39:
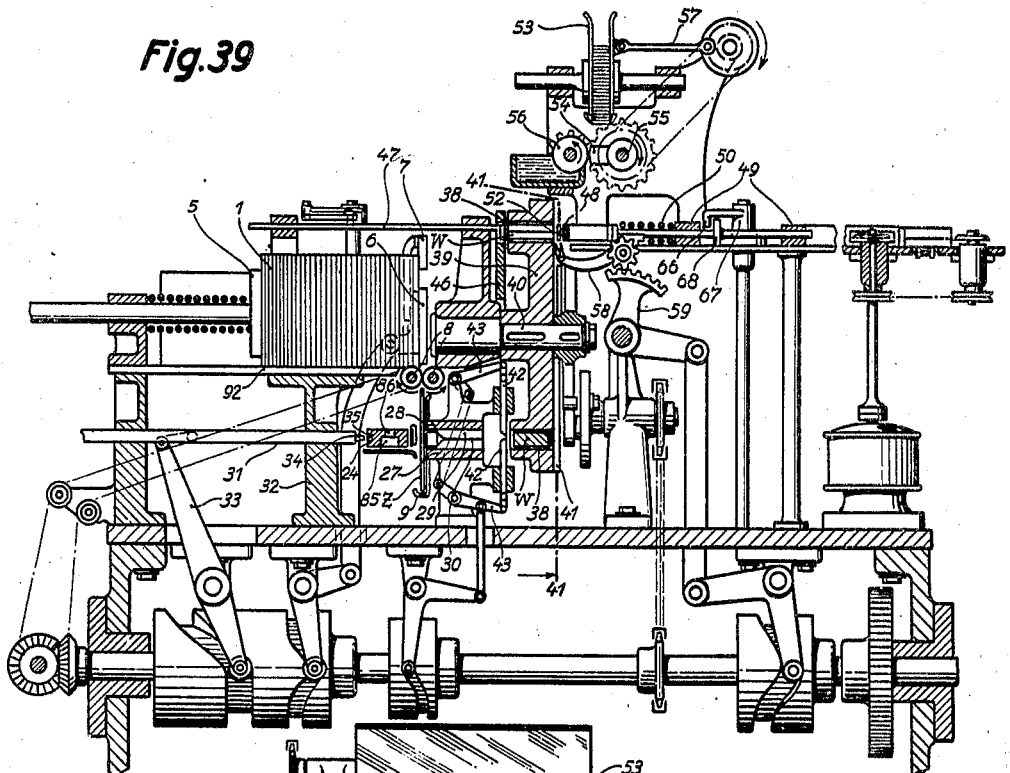
Fig. 39 is a section along line 39—39 of Fig. 37.
Figures 40, 41:
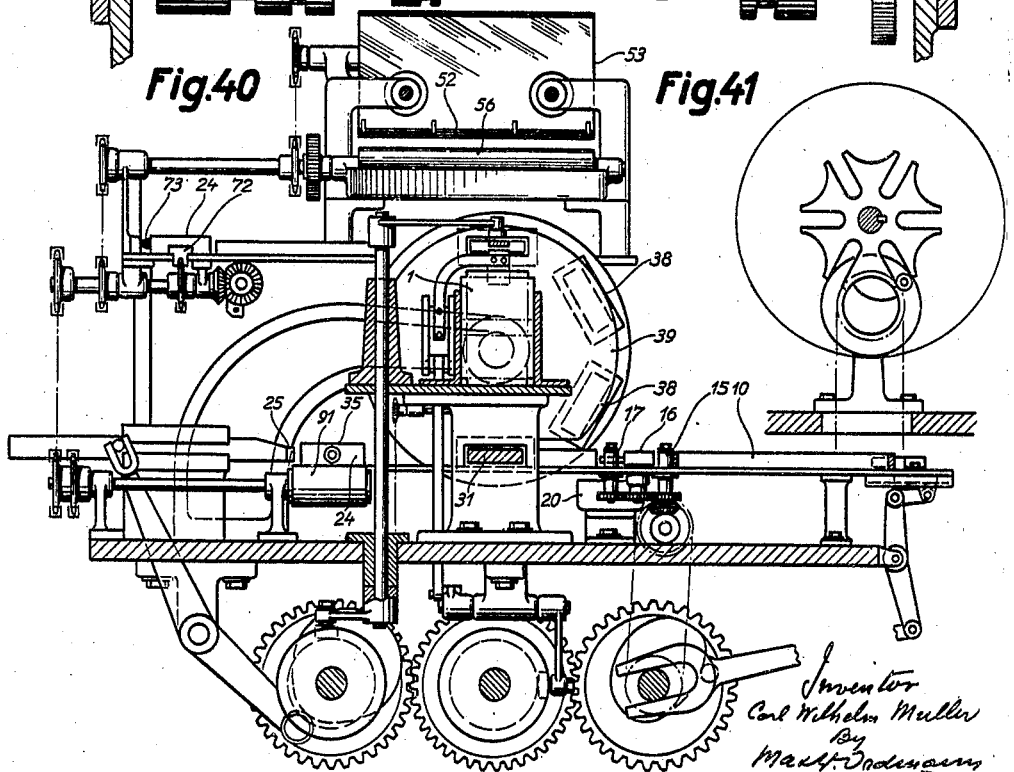
Fig. 40 shows a section along line 40—40 of Fig. 37.
Fig. 41 shows a section along line 41—41 of Fig. 39 illustrating the intermittent drive for the turntable.

In the embodiment shown in Figs. 20 to 22 the blank strip Zo is led from the bobbin 201 which is mounted on the shaft 202 to the table 203, to which is fed in the opposite direction the blank strip Zu coming from the right hand side of the junction point. First the blank strip Zo meets the gumming roller 204 which applies to the strip a rectangular patch S of adhesive. Gum is applied to the roller 204 by a roller 205 dipping in the gum bath 206. Then the strip passes between two pairs of rotary cutters 207, 207' which cut the strip on both sides to the required width. The pile holder 208 arranged to be moved vertically on the guide rod 209 is operated in such manner that every time a patch of adhesive S arrives beneath the pile, the holder descends and delivers the lowermost label to the strip. Behind the pile holder is arranged the pressure roller 210 which serves to press the applied label against the strip. The two rectangles seen in Fig. 21 are cut out by means of knives 211 and are operated in known manner by eccentrics 212. The pair of rollers 213, 214 serves to feed the strip and is combined with known controlling means which permit exact regulation of the speed of movement. The blank strip now moves into the path of scoring knives 215 mounted on a die 216 operated by an eccentric 217, the plate 218 serving as its support. The strip now passes between a pair of severing knives 219, 220, which, after the blank strip Zo has passed between the two dies 221, 222, to the point St and met the blank Zu, and the neck strip Za, depressed by the forming core F, is pressed firmly on the blank strips Zo and Zu, sever the blanks Zo and Zu at the same time from the strips.

It should be noted that the blank strip Zu coming from the right is also withdrawn from a bobbin and is subjected to the same treatment as the blank strip Zo until the blank Zu' is severed by the pair of knives 223, 224 from the strip. Before the die 221 moves downwards with the forming block F, the neck strip Za coming from the bobbin 225 which in known manner is provided with the grooving device R with the necessary ribs is led between the die 221 and the side flaps of the blank. The grooving device consists of a grooving knife carrier 226 which is guided on slide rods 227 and is operated by two eccentrics 228, the plate 229 serving as an abutment. The grooving device 230 mounted on the rod 231 ensures the feeding movement of the neck strip, the grooving device as shown in dotted position in Fig. 21 gripping the neck strip in front of the severing knives and laying it over the point of abuttal St. Before the die 221 leaves the forming block with the neck strip and the blank in the shaping channel 232, the pair of severing knives 233 operated in known manner come into operation and sever the blank Za' from the strip.

In the embodiment shown in Figs. 23 to 27 the shaping channel indicated at 28, 29 in Fig. 2 of the first embodiment is indicated by the reference character S. Adjacent the folding fingers indicated in Fig. 3 at 42 is a vertical channel 234 through which the box W formed in the manner described is fed by means of plunger 235 into a recess 236 of the turntable 237 adjacent the channel 234. In the recess 236 are arranged resilient plates 238, 239 which hold the box by pressing on the opposite walls.

After the box has been introduced, the turntable which is mounted on the pivot 240 is moved in the direction of the arrow shown in Fig. 24 through 90°, so that the box comes in front of the channel 241. Adjacent this shaping channel 241 is a pile channel 242 in which the labels 243 (the form of which is clear from Fig. 27) are pressed by means of a resilient plate 244 against the projection 245 half closing the lower opening of the channel 242. Beneath this channel 242 is a rockable suction head 246 which bends down the label which is lowermost for the time being in the manner indicated in Fig. 25 so that a gripper 247 can grip the now free end of the label and draw it in the direction of the arrow over a roller 250 dipping in the gum bath 249, so that the lower surface of the label is coated with adhesive. The gripper 247 feeds the label in front of the lower entrance to the shaping channel 241 so that the side coated with adhesive comes above the article W, Fig. 26. A die 248 now pushes the box into the shaping channel 241, bending over the four side portions a, b, c, d, of the label, the die 251 operated by the lever 252 to ensure the smooth positioning and pressing on the upper part of the box retreating with the advance of the die 248. When now the article has entered the shaping channel so that the four side portions of the label are pressed uniformly on the sides of the box, the article W is pushed by the die 251, while the die 248, is retracted, into the recess 236 in the turntable 237.

Now the turntable moves through 90° more, so that the article comes in front of the die 253, which feeds it into the horizontal shaping channel 254 in which it is advanced in the direction of the arrow by a die 255. In front of the exit from the shaping channel 254 is located the edge strip 256 brought in the same way as a strip 52 of Figs. 2, 6, and 7 into this position and coated with gum so that on coming into contact with the article W it bears on the front edge thereof and is pressed completely around the box by other means.

From this point the work is transferred to means which cut and subsequently fold the lid, removing the forming block in the same way and by the same means as shown in Figs. 2, 6 and 7.

According to the embodiment shown in Figs. 28 to 36 a gripper 260 is arranged adjacent to the shaping channel 241', which gripper feeds a label 262 from the pile holder 261 in which they are held, and the form of which is clear from Fig. 33, over a gumming roller 263 which dips in a bath 264 and places the same in front of the upper opening of the shaping channel so that the lines shown dotted in Fig. 33 come to be on the edges of the channel. The suction head 265 located in front of the pile holder serves in known manner to bend up the upper-most label in order to ensure that the latter will be properly gripped by the gripper. In the shaping channel 241' is mounted the die 266 which feeds the article W upwards so that the label 262 ready for use with the lines shown dotted in Fig. 33 bears on the edges of the article, the die 267 ensuring smooth pressing of the label on the lid of the box. While the die 267 retreats, the die 266 pushes the article between two bars 268 so that the parts of the label indicated at e in Fig. 33 bear against the sides of the article. Now folding fingers 269 operated by levers 270 move forward and fold the side flaps indicated at f in Fig. 33 and press it on the sides of the box (see Fig. 30) so that the label lies round the box as shown in perspective in Fig. 34. Now the die 266 moves upwards further, the die 267 operated by the lever 271 being retracted, pushing the article while bending the flaps indicated at g in Fig. 33 into the recess 273 of the turntable 272 acting as a shaping channel, so that the label embraces the article as is shown in perspective in Fig. 35. In these recesses are mounted resilient plates 274, 275 which hold the work after the die 266 has returned to its initial position.

Now the turntable 272 which is mounted on the pivot 276 rotates in the direction of the arrow in Fig. 29 through 90° so that the article with the label applied to the upper face and the four side faces lies in front of a device which is shown in Figs. 31 and 32 in two sections at right angles to one another. First the upper die 277 advances and pushes the article into the position shown in Fig. 31 so that about half of it projects from the recess 273. The die 278 which is operated in correspondence with the movement of the die 277 serves as an abutment. The shaped bending fingers 279 which are shown in Figs. 31 and 32 now move forward and press the label portions extending beyond the short end faces and press it against the bottom face of the box (Fig. 31). After the bending fingers have moved back again into their initial position, the bending fingers 280 (Fig. 32) arranged at right angles thereto advance and press the two parts of the label projecting beyond the end faces against the bottom of the article W so that the label is secured to the bottom of the box in the manner shown in Fig. 36. It should be observed that the die 278 serving as an abutment should only be sufficiently large not to prevent the operation of the pairs of bending fingers 279, 280. The article W now covered on all sides is retracted by the die 278 into the recess 273 of the turntable, which now feeds it to a device for further treatment. This further treatment comprises the cutting open of the box along three sides and the folding open of the upper half of the box as previously described for the other modification.

I claim:

1. In the production from foldable blanks of boxes comprising a base, a neck-forming member and a lid, uniting the structure comprising the base-forming and lid-forming blank with an open gummed neck-forming strip and shaping said parts between a shaping channel and a forming block movable along said channel to constitute a complete box structure.

2. In the production from foldable blanks of boxes comprising a base, a neck-forming member and a lid, applying to a blank comprising a base portion and a lid portion a gummed neck-forming strip portion located adjacent to the junction of said base and lid portions, passing said portions together with a forming block through a shaping channel whereby to form a box structure complete save for one side, then closing said box structure, uniting a gummed closing strip to said structure in a second shaping channel, imparting feeding movement to the closed box and during the feeding movement slitting the box at three sides, then folding over the lid and removing the forming block.

3. In the production from foldable blanks of boxes comprising a base, a neck-forming member and a lid, conveying the base-forming blank and the lid-forming blank toward one another until the edges of their side flaps abut in front of a shaping channel, uniting a neck-forming blank to said abutting blanks, and passing the united blanks together with a forming block through said channel to constitute a box-like structure.

4. In the production from foldable blanks of boxes comprising a base, a neck-forming member and a lid, leading strips in paths so as to form therefrom the base, the lid and the neck, severing the blanks from said strips during their travel, uniting the neck-forming blank to the base and lid forming blanks at the intersection of said paths, and passing the united blanks together with a forming block through a shaping channel to constitute a box-like structure.

5. In the production from foldable blanks of boxes comprising a base, a neck-forming member and a lid, leading in oppositely directed paths strips from which to form the base and the lid, leading in a path perpendicular to said first-mentioned paths a strip from which to form the neck, making ready and severing the blanks during their travel, applying the neck-forming blank to abutting base-forming and lid-forming blanks where said paths intersect, pressing said blanks together and passing said blanks together with a forming block through a shaping channel to constitute a box-like structure.

6. In the production from foldable blanks of boxes comprising a base, a neck-forming member and a lid, uniting the base-forming, lid-forming and neck-forming blanks, shaping them to form a box structure, closing the box, applying a label to the box, folding the label over the sides of the box in a second channel withdrawing the labelled box from said second channel, and uniting the labelled box with a gummed closing strip.

7. In the production from foldable blanks of boxes comprising a base, a neck-forming member and a lid, uniting the base-forming, lid-forming and neck-forming blanks and shaping them in a channel to form a box structure, bringing into position to be applied to said structure a label having flaps to cover the sides of said structure, passing said structure with the label through another channel to fold over certain of said flaps to contact with corresponding walls of said structure, folding over other flaps against other walls of the box structure, applying the extremities of the label to the under side of the box, cutting the box at three sides and folding over the lid for removal of a forming block from the box.

8. In apparatus for the production of boxes from foldable blanks comprising a base, a lid and a neck strip, in combination, means for uniting the neck strip to the base and lid-forming blank, an open-ended shaping channel, a forming block movable with said united strip and blanks through said channel and cooperating with said channel to produce a box-like structure, an intermittently rotatable carrier presenting a second channel, means for transferring said structure with said block from said first channel to said second channel, means for passing said structure with said block through said second channel, means in said second channel for folding over portions of said structure, a third channel, means for rotating said carrier to bring said second channel opposite said third channel, means for transferring said structure from said second channel to said third channel, means for applying a gummed closing strip to said structure, means for moving said structure with said closing strip through said third channel, means for slitting the closed box on three sides, means for opening the box and means for removing said forming block.

9. In apparatus for the production of boxes from foldable blanks comprising a base, a lid and a neck strip, in combination, means for uniting the neck strip to the base and lid-forming blank, an open-ended shaping channel, a forming block provided with a recess and movable with said united strip and blanks through said channel and co-operating with said channel to produce a box-like structure, an intermittently rotatable carrier presenting a second channel, means for transferring said structure with said block from said first channel to said second channel, means for passing said structure with said block through said second channel, means in said second channel for folding over portions of said structure, a third channel, means for rotating said carrier to bring said second channel opposite said third channel, means for transferring said structure from said second channel to said third channel, means for applying a gummed closing strip to said structure, means for moving said structure with said closing strip through said third channel, means for slitting the closed box on three sides, means for opening the box, a gripper engageable with the recess in said forming block, a conveyor, means for operating said gripper to cause it to engage said recess, remove said block from the opened box and deposit it on said conveyor, and means for transferring said block to a position in front of said first mentioned channel.

10. In apparatus for the production of boxes from foldable blanks comprising a base, a lid and a neck strip, in combination, means for uniting the neck strip to the base- and lid-forming blank, an open-ended shaping channel, a forming block movable with said united strip and blank through said channel and co-operating with said channel to produce a box-like structure, means for applying a closure to said structure to close the box, means for opening the box, a gripper constituted as a suction head for removing the block from the open box, a conveyor, means for operating said gripper to cause it to lift the block on to said conveyor and means for returning the block to blank-engaging position.

11. In apparatus for the production of boxes from foldable blanks each comprising a base and a lid, and a neck strip, in combination, an open-ended shaping channel, means for holding a pile of forming blocks, a holder having resilient walls leading from said holding means to the front end of said channel, a die for feeding said blocks through said holder, means for passing a block together with a united neck strip and blank through said channel to produce a box-like structure, means for finishing the box, means for removing the forming block from the finished box and means for returning said forming block to said pile.

12. In apparatus for the production of boxes from foldable blanks comprising a base, a lid and a neck strip, in combination, an open ended shaping channel, a vertically movable holder containing a pile of forming blocks, said holder having resilient side walls, a horizontal plate above which said holder is movable, a plunger movable in said holder and adapted to feed a forming block together with united base- and lid- and neck-forming blanks to said channel, means for returning said plunger to initial position, said plunger entraining said holder in its return movement and opening said holder, and a stop for arresting said holder on descent of said plunger.

13. In apparatus for the production of boxes from foldable blanks comprising a base, a lid and a neck strip, in combination, means for holding said blanks in piles, slides for removing the bottom blanks of piles of base-forming blanks and lid-forming blanks, means for bringing a base-forming blank and a lid-forming blank together with their side flaps in abutting relation, a slide for removing the lowermost blank from the pile of neck-forming blanks, feed rollers for gripping said last mentioned blank, a gumming roller for gumming said last mentioned blank, and feed rollers adjustable in the direction of feed for feeding said last mentioned blank to the junction of the base-forming and lid-forming blanks, a shaping channel and means including a forming block whereby on passage of said forming block together with the base-forming, lid-forming and neck-forming blanks through said channel a box-like structure is produced.

14. In apparatus for the production of boxes from foldable blanks comprising a base, a lid and a neck strip, in combination, an open-ended shaping channel, means for uniting the base-and lid-forming blanks with the neck forming blank, means including a forming block adapted to be passed with said united blanks through said channel whereby said united blanks are shaped to constitute a box-like structure, a feeding channel capable of receiving a number of box-like structures, means for transferring said box-like structures from said shaping channel to said feeding channel and for feeding said structure intermittently along said feeding channel, and means near the entrance to said feeding channel for heating said feeding channel.

15. In apparatus for the production of boxes from foldable blanks comprising a base, a lid and a neck strip, means for uniting a neck strip to a blank comprising a base and a lid portion, an open-ended shaping channel, a forming block movable with said united strip and blank through said channel to form from the united strip and blank a box-like structure, a channel having a slot, means for transferring said structure from said first mentioned channel to said second channel and leading it through said second channel, means for introducing an edge strip into said slot and laying it around the sides of said structure, a rotary drum having a pocket, means for transferring said structure from said second channel to said pocket, and means for fixing said edge strip to said structure on its transference to said pocket.

16. In apparatus for the production of boxes from foldable blanks comprising a base, a lid and a neck strip, a shaping channel, a forming block co-operating with said channel to shape to a box-like structure blanks constituting a base, a lid and a neck strip, vertically movable means holding a pile of edge strips, a roller having two gumming segments for removing edge strips one at a time from said pile, said segments having slots, channel carriers, stripper bars entering said slots and serving to deliver a gummed edge strip to said carriers, said stripper bars presenting said edge strip to said box-like structure and means for leading said edge strip around said box-like structure.

17. In apparatus for the production of boxes from foldable blanks comprising a base, a lid and a neck strip, means for uniting base- and lid-forming blanks to a neck strip blank, a shaping channel, a forming block engageable with said united blanks and movable through said channel, said block in co-operation with said channel shaping said blanks to constitute a box-like structure, a rotatable drum presenting pockets, means for transferring the box-like structure to a pocket in said drum, a second channel having walls constituted by brushes, means for transferring said structure from said pocket to said second channel and feeding said structure along said second channel, a conveyor to receive structures brushed in said second channel, a third channel provided with brushes, rotary cutters for cutting certain sides of the box, means for heating said third channel in front of said cutter, and means for transferring boxes to said third channel.

18. In apparatus for the production of boxes from foldable blanks, comprising a base, a lid and a neck strip, in combination, means for uniting a neck strip to a base and lid forming blank, an open-ended shaping channel, a forming block movable with said united strip and blank through said channel to constitute a box-like structure, means for applying an edge strip to said box-like structure to close the box, means for slitting the box on three sides, means for opening the box, means for removing the forming block from the interior of the box, and means for closing the lid of the box.

19. In the production from foldable blanks of boxes having a base, a neck forming member and a lid, means to unite said box blank with a neck forming member, a forming block, means to fold said blank and neck forming member about said block into box shape, means for binding said folded blank and member together to complete a box structure and means for cutting said completed box structure along three sides to remove said block.

CARL WILHELM MÜLLER.